United States Patent

[11] 3,633,827

[72] Inventor Ronald L. Novak
La Porte, Ind.
[21] Appl. No. 31,933
[22] Filed Apr. 27, 1970
[45] Patented Jan. 11, 1972
[73] Assignee Sprague Devices Inc.
Michigan City, Ind.

[54] WINDSHIELD WASHER UNIT
8 Claims, 3 Drawing Figs.

[52] U.S. Cl.................................................. 239/284,
15/250.02, 239/363
[51] Int. Cl........................................................ B05b 1/10
[50] Field of Search............................................ 239/284,
360–363; 15/250.01, 250.02

[56] References Cited
UNITED STATES PATENTS
2,634,166 4/1953 Sacchini...................... 239/284 X
2,153,519 4/1939 Horton........................ 239/284 X
2,594,437 4/1952 Horton........................ 239/284
2,722,455 11/1955 Oishei........................ 239/284 X FOREIGN PATENTS
631,019 12/1961 Italy............................ 239/284

Primary Examiner—M. Henson Wood, Jr.
Assistant Examiner—Michael Y. Mar
Attorney—Oltsch & Knoblock ABSTRACT: A windshield washer unit includes a reservoir for a spray solution, a pressurized air-actuated pump having an inlet submerged in said solution and a passageway adapted for communication with windshield spray nozzles. A control valve having an inlet adapted for communication with a pressurized air source and a passageway in communication with said pump is provided for introducing pressurized air into said pump. Means are provided for purging the spray nozzles of solution upon the discontinuation of the introduction of air into said pump.

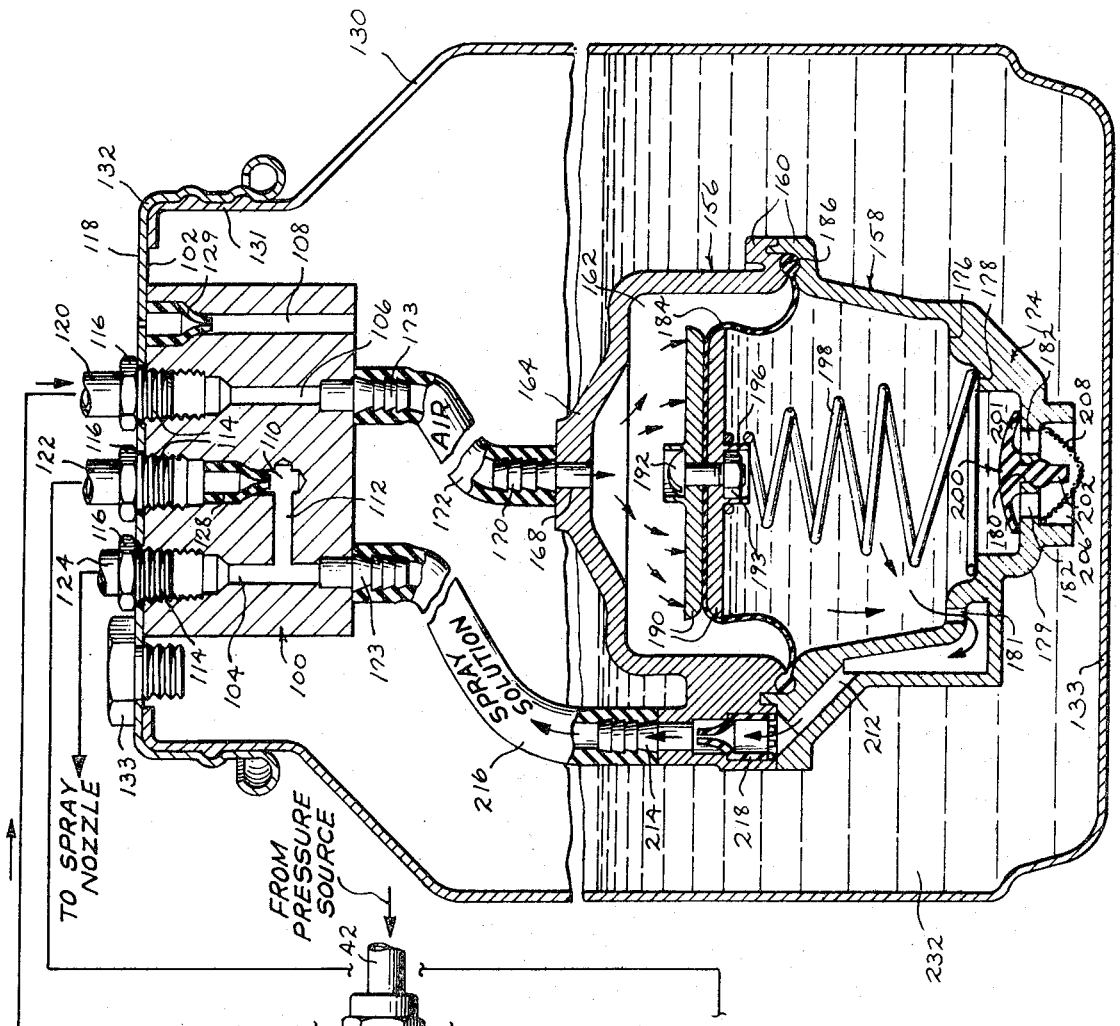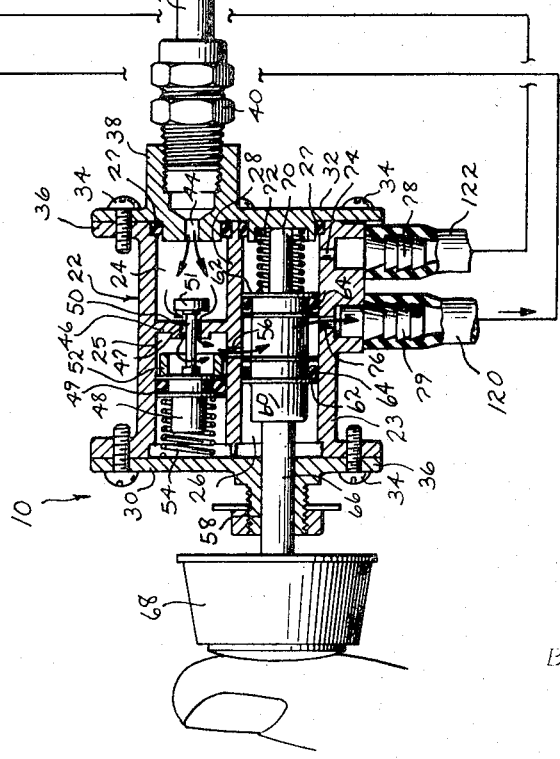
Fig. 2
INVENTOR
RONALD L. NOVAK
BY Oltsch & Knoblock
ATTORNEYS

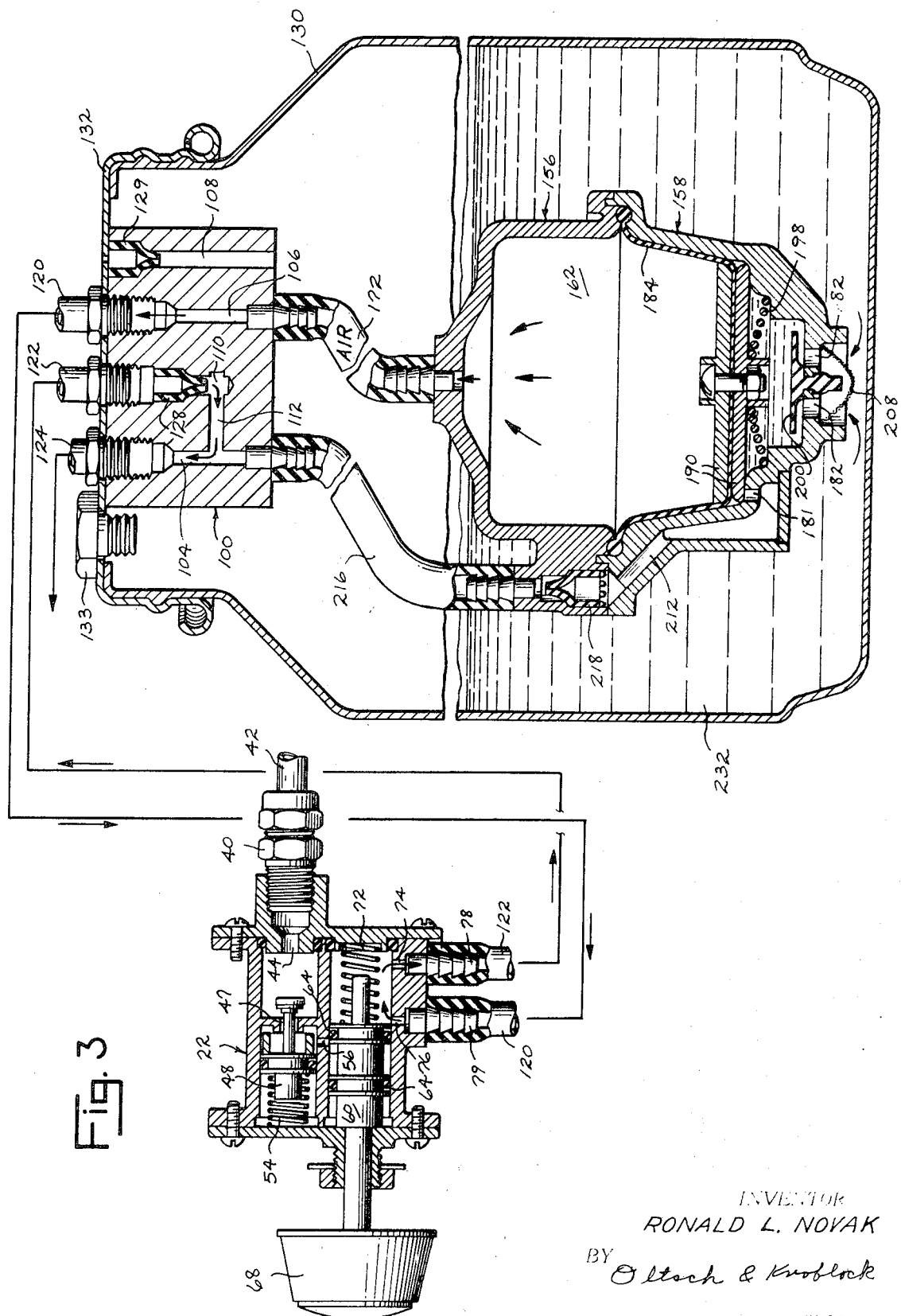

WINDSHIELD WASHER UNIT

SUMMARY OF THE INVENTION

This invention relates to a windshield washer unit and includes a reservoir for a spray solution and a pressurized air-actuated pump having an inlet submerged in the solution in said reservoir and an outlet adapted for communication with windshield spray nozzles. A control valve having an inlet adapted for communication with a pressurized air source and a passageway in communication with said pump is provided for introducing pressurized air into said pump. Means are provided for purging said spray nozzles of solution upon the discontinuation of the introduction of air into said pump.

The windshield washer unit of this invention is adapted for connection to a pressurized air source, such as that available on trucks, buses and similar vehicles carrying sources of compressed air. This invention includes means for purging the spray nozzles and conduits which interconnect the nozzles with the fluid pump of the system, thereby preventing clogging of the conduits and nozzles as by freezing of solution therein during winter use. The windshield washer unit consists of a minimum of moving parts thereby improving its durability and reducing need for maintenance as compared to prior types of windshield washer systems.

The unit of this invention is leakproof and can be used in tilt cab trucks. During periods in which the unit is not in use the fluid reservoir and pump components of the unit are isolated from the air pressure source, thus minimizing the risk of air pressure leaks in the system.

Accordingly, it is an object of this invention to provide a windshield washer unit which is actuated by a pressurized gas and which is characterized by safe operation.

It is a further object of this invention to provide a windshield washer unit which includes means for purging the windshield spray nozzles and associated conduits of spray solution upon deactivation of the unit.

Another object of this invention is to provide a windshield washer unit having a minimum of moving parts.

Another object of this invention is to provide a windshield washer unit of simple construction and high durability.

Still another object of this invention is to provide a windshield washer unit which is of leakproof construction and which may be used in tilt cab trucks.

A further object is to provide a device having a spraying cycle of selected duration which permits discharge of any selected part of a maximum potential discharge per cycle.

Other objects of this invention will become apparent upon a reading of the invention's description.

BRIEF DESCRIPTION OF THE DRAWING

A preferred embodiment of this invention has been chosen for purposes of illustration and description wherein:

FIG. 2 is an enlarged fragmentary sectional view showing the windshield washer system in one operative position.

FIG. 3 is an enlarged fragmentary sectional view showing the windshield washer system in another operative position.

DESCRIPTION OF THE PREFERRED EMBODIMENT

Figure 1:
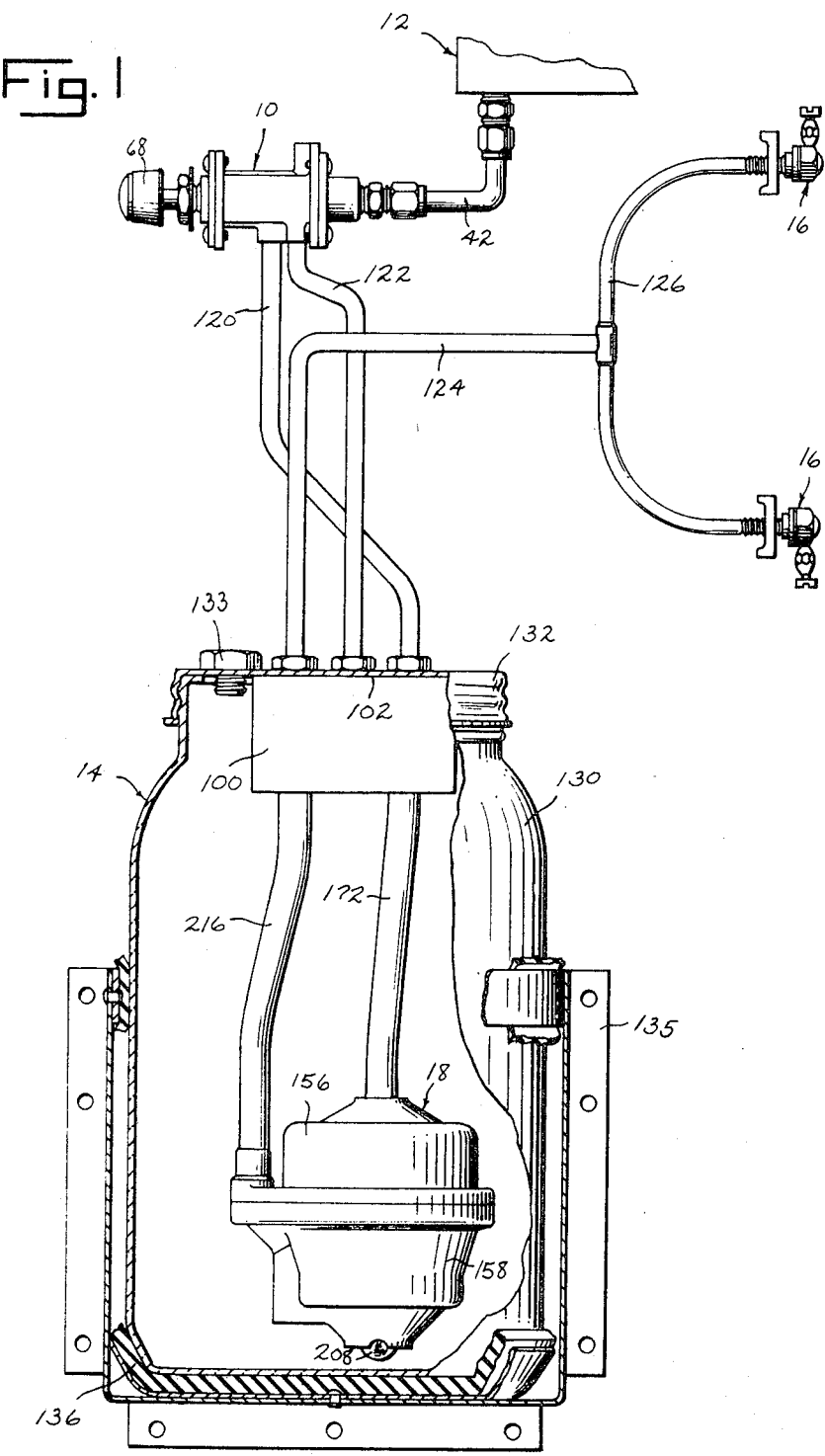
- FIG. 1 is a side view of the windshield washer system of this invention, with parts broken away.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

One embodiment of this invention is illustrated in FIG. 1 and includes a manually actuated control valve 10 having its inlet connected to a pressurized air source 12, such as a tank of compressed air, and having its outlet connected to a fluid reservoir 14. Reservoir 14 includes an air-operated pump 18 which is connected to windshield spray nozzles 16 and serves to discharge fluid from the reservoir through the nozzles.

CONTROL VALVE ASSEMBLY

The control valve 10 includes a valve housing 22 which is adapted to be mounted to the dashboard of a vehicle having a windshield (not shown). Valve housing 22 comprises a central member 23 and end members 30 and 32 which cooperate to define an elongated chamber 26 and two axially aligned chambers 24 and 25 separated from chamber 26 by longitudinal wall 28 and separated from each other by a transverse wall 46. End members 30 and 32 are attached to the opposite ends of the central member 23 by securing means such as headed screws 34 which are inserted through apertures in the marginal edge of each end member and anchored in screw-threaded bores in each out-turned end flange 36 of the central member 23. O-rings 27 may be snugly received within complementary annular recesses formed between end member 32 and the central member 23. End member 32 includes an internally threaded protruding fitting part 38 which receives a threaded coupling 40. A conduit 42 is connected to coupling 40 and extends to and is connected to gas pressure source 12, such as an air pressure tank or chamber. A small aperture 44 in wall 32 provides communication between fitting 38 and chamber 24.

Wall 46 of valve housing 22 has a central aperture 47 which serves to place chambers 24 and 25 in communication. Wall 28 of valve housing 22 has an aperture 56 which provides communication between chamber 25 and chamber 26. A piston 48 is longitudinally shiftable within chamber 25 of valve housing 22 and preferably has an outer circumferential groove which receives a ring seal 49 which engages the inner side wall surface of chamber 25. A pin 50 in axial alignment with piston 48 projects from the piston and extends with clearance through aperture 47 in wall 46 and into chamber 24. A disk or head member 51 having a diameter preferably slightly larger than the diameter of aperture 47 is carried by the free end of the pin 50 in chamber 24. An annular spacer flange 52 having an outer diameter slightly less than the diameter of chamber 25 extends forwardly from the end face of piston 48 adjacent to wall 46. A helical spring 54 is disposed within chamber 25, having one end engaging end member 30 and its other end engaging the end face of piston 48 so as to normally urge piston 48 and annular flange 52 toward wall 46 as shown in FIG. 3.

End member 30 has an aperture 58 therein which communicates with chamber 26. Slidably housed within chamber 26 is a piston 60. Piston 60 includes two longitudinally spaced pairs of annular flanges 62. Each pair defines a circumferential groove and receives a seal ring 64 which engages the wall surface of chamber 26. Piston 60 includes a longitudinally extending shaft 66 which passes through aperture 58 in end member 30. A pushbutton or knob 68 is attached to the exterior end of shaft 66. A longitudinal projection 70 of piston 60 extends toward wall 32 and a helical spring 72 encircles projection 70 and has one end engaging end member 32 and its other end engaging the end face of piston 60.

Central member 23 of valve housing 22 has an aperture 74 located adjacent end member 32 which communicates with chamber 26 and an aperture 76 which also communicates with chamber 26 and is spaced longitudinally from aperture 74 and from end member 30. The spacing between seal rings 64 and the length of projection 70 of piston 60 are so related to the positions of apertures 56, 74 and 76 longitudinally of the valve housing 22 that when pushbutton 68 pushed inwardly to its limit position with projection 70 abutting end member 32, the seal rings 64 are positioned at opposite sides of apertures 56 and 76 to open them for communication or gas flow therebetween as shown in FIG. 2. When pushbutton 68 is released for movement to its opposite limit position by helical spring 72, the sealing rings 64 are positioned at opposite sides of aperture 56 and permit communication between apertures 74 and 76 as shown in FIG. 3. Hollow male coupling members or fittings 78 and 79 are carried by valve housing part 23 in communication with apertures 74 and 76 respectively.

FLUID RESERVOIR

Fluid reservoir 18 includes a containment vessel or bottle 130 which may be formed of glass or plastic and which is preferably at least semitransparent so as to provide a visual indication of the fluid level therein. A threaded cap 132 receives the threaded neck portion 131 of bottle 130. Bottle 130 is seated within a bracket 135 which is mounted to the firewall or a similar structure within the engine compartment of the vehicle. Bracket 135 preferably includes resilient padding 136, such as foam rubber, against which bottle 130 rests. Cap 32 includes an aperture at one edge into which a plug 133 is threaded. Plug 133 is removed to replenish the bottle with spray liquid.

A housing 100 is attached to the inner face 102 of cap 132 and protrudes with clearance into neck portion 131 of bottle 130. Three bores 104, 106 and 108 extend through cap 132 and housing 100. A fourth bore 110 extends through cap 132 and into housing 100 where it is connected to bore 104 by passage 112. Each bore 104, 106 and 110 is threaded in housing 100 adjacent cap 132 and receives a threaded fitting 114 which extends through the cap. Each fitting 114 preferably includes a flanged head 116 which abuts the outer face 118 of cap 132 as the fitting is turned in its receiving bore and thereby serves to rigidly hold housing 100 against the cap. A hollow male coupling or fitting 173 is carried in each of the opposite ends of bores 104 and 106. A conduit 120 has one end connected to fitting 79 of valve 10 and its opposite end connected to fitting 114 in bore 106 of reservoir housing 100. A conduit 122 has one end connected to fitting 78 of valve 10 and its opposite end connected to fitting 114 in bore 110 of the reservoir housing. A conduit 124 has one end connected into a conduit 126 which interconnects windshield spray nozzles 16 and its opposite end connected to fitting 114 in bore 104 of the reservoir housing. A one-way valve 128 is located in bore 110 and is operatively positioned so as to only permit fluid flow from conduit 122 into bore 110. A one-way valve 129 is located in bore 108 of the reservoir housing and is operatively positioned to permit the flow of atmospheric air into the reservoir.

AIR-OPERATED PUMP

Pump 18 is positioned within fluid reservoir 20 and includes two cup-shaped housing parts 156 and 158. Each housing part 156 and 158 has an end wall and an integral side wall which includes an annular out-turned marginal flange 160. Housing parts 156 and 158 are joined at flanges 160 and cooperate to define a pump chamber 162. The end wall 164 of housing part 156 has a centrally located aperture 168 therein. A hollow male coupling or fitting 170 is carried in aperture 168 and projects outwardly from end wall 164 to receive one end of a conduit 172. The other end of conduit 172 is connected to the fitting 173 carried in bore 106 of reservoir housing 100. End wall 174 of housing part 158 is tapered and defines stepped annular concentric shoulders 176 and 178 and an end part 179. End part 179 has an aperture 180 formed therein which is concentric with shoulder 178. An aperture 181 is formed in end wall 174 adjacent the side wall of the housing part and preferably in shoulder 176. At least one and preferably a plurality of apertures 182 are formed in end wall part 179 and spaced slightly from aperture 180 therein.

A flexible diaphragm 184, preferably constructed of a durable rubber or synthetic composition, is positioned across pump chamber 162 and includes a beaded circumferential edge 186 which is seated within an annular groove formed cooperatively by flanges 160 of housing parts 156 and 158. Backing members 190 are positioned on opposite sides of diaphragm 184 and are connected to the diaphragm by a headed screw 192 which extends through the backing members and diaphragm and is anchored by a nut 193. The backing member 190 nearest end wall 174 of housing part 158 includes a centrally positioned, laterally projecting annular flange part 196. A tapered helical spring 198 is positioned within pump chamber 162 below diaphragm 184 and preferably has its large end abutting shoulder 178 of housing part end wall 174 and its smaller end received about flange part 196 and abutting the associated backing member 190. A one-way valve member 200 having a flexible concavo-convex disk-shaped valve part 201 and a central stem 202 extending outwardly from the concavo side of the valve part is secured to end wall 174. Stem 202 is carried within aperture 180 of the end wall as shown in FIGS. 2 and 3 with valve part 201 covering apertures 182 in the end wall and the circumferential periphery of the valve part engaging the end wall of housing part 158, as shown in FIG. 2. End wall part 179 is recessed at 206. A screen 208 is inserted into recess 206.

Housing parts 156 and 158 include thickened side wall portions which define a passage 212 having one end communicating with aperture 181 in housing part 158 and having its other end carrying a hollow male coupling or fitting 214. A conduit 216 has one end connected to fitting 214 and its other end connected to fitting 173 carried in bore 104 of reservoir housing 100. A one-way valve 218 is located in passage 212 and positioned so as to permit fluid flow through conduit 216 from pump 18 to reservoir housing 100 only. The length of conduits 172 and 216 which interconnect fluid pump 18 to reservoir housing 100 are such that pump 18 is held in a suspended state within bottle 130, having end wall 174 of housing part 158 and screen 208 slightly spaced from bottom 133 of the bottle.

OPERATION OF THE WINDSHIELD WASHER UNIT

Fluid 232, such as an aqueous spray solution having cleaning agents and preferably an ice inhibitor therein, is contained within bottle 130 of fluid reservoir 20. Referring first to FIG. 2, the vehicle driver pushes button 68 of control valve 10. As button 68 is pushed inwardly and held at its limit position with projection 70 of piston 60 abutting end member 32 of valve housing 22, apertures 56 and 76 in the housing central member 23 are placed in communication and permit gas from pressure source 12 to flow from housing chamber 25 through aperture 56 into housing chamber 26 and out aperture 76 into conduit 120. Piston 48, pin 50 and disc member 51 of control valve 10 serve as a pressure reducer whose construction and method of operation are well known in the art.

Pressurized gas from conduit 120 enters bore 106 in reservoir housing 100 where it then passes through conduit 172 and into chamber 162 of pump 18. The pressurized gas in entering pump chamber 162 causes diaphragm 184 to move downwardly compressing spring 198 and causing the spray solution 232 in the pump chamber at the opposite side of the diaphragm to be forced out aperture 181 in end wall 174 of pump housing part 158 and into conduit 216. Due to the one-way action of valve member 200 in housing part 158, no fluid within the lower portion of pump chamber 162 passes through apertures 182 in the housing part. Solution 232 passes through valve 218 and bore 104 in reservoir housing 100 and into conduit 124 where it is carried to spray nozzles 16. No solution passes into conduit 122 due to the action of valve 128.

As illustrated in FIG. 3, after discharge of all or a selected part of the spray solution 232 contained within the lower portion of pump chamber 162, the vehicle operator releases button 68 of control valve 10 thereby permitting spring 72 in chamber 26 of the valve to urge piston 60 to a position abutting end member 30 of the valve housing, as shown. Apertures 56 and 76 in the valve are isolated from each other by a piston seal ring 64, thus causing the gas from pressure source 12 to be shut off. With pressure source 12 isolated from pump 18, spring 198 in the pump urges diaphragm 184 into its upper position within pump chamber 162 and in doing so forces the residual gas in the upper part of chamber 162 out through aperture 168 in pump housing part 156 and into conduit 172. From conduit 172 the residual gas passes through bore 106 in the reservoir housing and conduit 120 and into chamber 26 in valve 10. The residue gas then exits valve chamber 26 through aperture 74 therein and passes through conduit 122, valve 128, bore 110, passage 112, bore 104, all in reservoir housing 100, and into conduit 124 where it is expelled from spray nozzles 16 to purge the system between the pump and nozzles of any spray solution remaining therein. The residual gas is prevented from reentering pump 18 by valve 218 in the pump housing.

As diaphragm 184 is urged into its upper position in pump chamber 162 by spring 198, additional spray solution 232 to replenish that which was expelled from pump 18 is drawn from bottle 130, past valve member 200 and through apertures 182 in pump housing part 158, and into the lower part of pump chamber 162. As this additional solution is drawn into the lower part of pump chamber 162 from the bottle, valve 129 in bore 108 of the reservoir housing opens permitting atmospheric air to enter bottle 130 to prevent a vacuum or air lock from forming within the reservoir. After the lower part of pump chamber 162 is filled with spray solution, the windshield washer unit can be actuated again by the pressing of pushbutton 68 of control valve 10.

It will be understood that the invention is not to be limited to the details herein given but may be modified within the scope of the appended claims.

What I claim is:

1. A windshield washer unit including a reservoir for a spray solution; a pump having a partition member therein defining first and second chambers within said pump; said second chamber having an inlet adapted for submersion in said solution in the reservoir and an outlet in communication with a windshield spray nozzle; said first chamber having a port therein; a control valve means having an inlet adapted for connection with a gas pressure source, an outlet in communication with said windshield spray nozzle, and a port in communication with said pump port; said pump partition member being shiftable between a normal position wherein said second pump chamber is adapted to accommodate a portion of said solution which is drawn into said second pump chamber through said pump inlet and a limit position wherein said second pump chamber is reduced in volume so as to cause the portion of said solution therein to be forced out said pump outlet; said control valve means having a first operative position wherein gas from said pressure source when connected to said valve means inlet is introduced into said first pump chamber through said pump port to shift said pump partition member from its normal position into its limit position and having a second operative position wherein said valve means port and outlet are placed in communication and said pressure source is isolated from said pump to permit said gas in said first pump chamber to flow through said pump port, valve means port and outlet, and windshield spray nozzle as said pump partition member shifts from said limit position into its normal position.

2. The windshield washer unit of claim 1 wherein said reservoir includes a venting means permitting atmospheric air to enter said reservoir when said portion of the solution in said reservoir is drawn through said pump inlet and into said pump second chamber.

3. The windshield washer unit of claim 1 wherein said pump includes a rigid housing having a cavity therein and a flexible diaphragm extending transversely within said cavity so as to divide said cavity into said first and second chambers.

4. The windshield spray unit of claim 3 wherein said diaphragm includes a flexible wall part; means normally urging said wall part into said first chamber; said wall part being shiftable into said second chamber when said gas is introduced into said first chamber.

5. The windshield washer unit of claim 1 wherein said reservoir includes a cap; said pump disposed within said reservoir; said cap having a plurality of openings therein; first means in association with one of said cap openings defining a fluid conducting passage from said valve means port to said pump port; second means in association with another of said cap openings defining a fluid conducting passage from said pump outlet to said windshield spray nozzle.

6. The windshield washer unit of claim 1 wherein said reservoir includes a cap having a plurality of openings therein; said cap carrying a housing part having a plurality of bores; each bore in registry with an opening in said cap; a first conduit extending between and interconnecting said valve means port and the cap opening registering with a first of said bores, said first bore opening into said reservoir and having a second conduit attached thereto and interconnecting said first bore to said pump port; a third conduit extending between and interconnecting said windshield spray nozzle and the cap opening registering with a second of said bores; said second bore opening into said reservoir and having a fourth conduit attached thereto and interconnecting said second bore to said pump outlet; a fifth conduit extending between and interconnecting said valve means outlet and the cap opening registering with a third of said bores; said third bore communicating with said second bore; and valve means permitting solution flow through said fifth conduit from said valve means outlet to said third bore only.

7. The windshield washer unit of claim 6 wherein said housing part includes a fourth bore therethrough in registry with an opening in said cap.

8. The windshield washer unit of claim 7 including one-way valve means in one of said fourth bore and registering cap opening permitting flow of atmospheric air into said reservoir whenever the volume of solution within said reservoir is reduced.

\* \* \* \* \*